US011702880B2

(12) United States Patent
Carter et al.

(10) Patent No.: US 11,702,880 B2
(45) Date of Patent: Jul. 18, 2023

(54) CAPACITIVE TOUCH VEHICLE ACCESSORY

(71) Applicant: Tectum Holdings, Inc., Ann Arbor, MI (US)

(72) Inventors: Chad Carter, Manchester, MI (US); Jerome Facchinello, Grand Blanc, MI (US)

(73) Assignee: Extang Corporation, Ann Arbor, MI (US)

( * ) Notice: Subject to any disclaimer, the term of this patent is extended or adjusted under 35 U.S.C. 154(b) by 173 days.

(21) Appl. No.: 17/005,162

(22) Filed: Aug. 27, 2020

(65) Prior Publication Data

US 2022/0065020 A1 Mar. 3, 2022

(51) Int. Cl.
| | | |
|---|---|---|
| *E05F 15/73* | (2015.01) | |
| *B60J 7/14* | (2006.01) | |
| *B62D 33/027* | (2006.01) | |
| *B60Q 3/30* | (2017.01) | |
| *B60Q 3/80* | (2017.01) | |
| *G08C 17/02* | (2006.01) | |

(52) U.S. Cl.
CPC .............. *E05F 15/73* (2015.01); *B60J 7/141* (2013.01); *B60Q 3/30* (2017.02); *B60Q 3/80* (2017.02); *B62D 33/0273* (2013.01); *G08C 17/02* (2013.01); *E05Y 2400/44* (2013.01); *E05Y 2400/45* (2013.01); *E05Y 2400/86* (2013.01); *E05Y 2900/546* (2013.01); *G08C 2201/91* (2013.01)

(58) Field of Classification Search
CPC ...... E05F 15/73; B60J 7/141; B62D 33/0273; G08C 17/02; G08C 2201/91; E05Y 2400/44; B60R 9/065; B60Q 3/30
See application file for complete search history.

(56) References Cited

U.S. PATENT DOCUMENTS

| | | | |
|---|---|---|---|
| 7,679,212 B2 | 3/2010 | Ando | |
| 8,706,350 B2 | 4/2014 | Talty et al. | |
| 9,739,082 B2 | 8/2017 | Krauss et al. | |
| 9,875,591 B2 | 1/2018 | Watters et al. | |
| 2010/0102943 A1* | 4/2010 | Rutledge | ............... B60R 25/246 340/426.36 |
| 2011/0043325 A1 | 2/2011 | Newman et al. | |
| 2012/0173051 A1 | 7/2012 | Tarnutzer | |
| 2016/0075275 A1* | 3/2016 | Salter | ...................... B60Q 3/20 315/77 |
| 2016/0186480 A1 | 6/2016 | Krauss et al. | |
| 2019/0072415 A1* | 3/2019 | Lesák | ................. G01N 27/221 |
| 2019/0315267 A1* | 10/2019 | Salter | ...................... B60Q 1/24 |
| 2019/0315294 A1* | 10/2019 | Salter | .................. H03K 17/955 |

(Continued)

OTHER PUBLICATIONS

Article entitled: Rivian R1T and R1S: Top 10 Hidden Features That Make an Electric Off-Road Vehicle, by Simon Alvarez, dated Nov. 29, 2018 https://www.teslarati.com/rivian-r1t-r1s-hidden-features-details-electric-truck-suv/.

*Primary Examiner* — Vernal U Brown
(74) *Attorney, Agent, or Firm* — The Dobrusin Law Firm, P.C.

(57) ABSTRACT

A system for a vehicle having an accessory positioned along the vehicle. The system may also include a sensor located along the vehicle in wireless communication with the accessory, wherein the sensor triggers activation of the accessory based on input from an external source.

20 Claims, 3 Drawing Sheets

(56) References Cited

U.S. PATENT DOCUMENTS

| | | |
|---|---|---|
| 2020/0198578 A1 | 6/2020 | Schroll et al. |
| 2020/0240197 A1* | 7/2020 | Nagase ................ H03K 17/955 |
| 2021/0354537 A1* | 11/2021 | Kneifl ................ B62D 33/0273 |

* cited by examiner

CAPACITIVE TOUCH VEHICLE ACCESSORY

FIELD

The present teachings generally relate to a vehicle, and more particularly, to a vehicle having one or more capacitive touch or remote accessories.

BACKGROUND

Vehicle consumers continue to transition from traditional passenger sedans into Sport Utility Vehicles (SUV's) and trucks for everyday transportation and use. Accordingly, these consumers are often seeking the same conveniences found on the more traditional sedans in their SUV and truck. These conveniences may include, but are not limited to, remote starting of the vehicle, keyless entry, push-start, wireless connectivity, power-operated doors and tailgates, or a combination thereof.

In an effort to provide consumers with more of theses conveniences, vehicle manufacturers and aftermarket suppliers are continuing to advance technology, making it easier and more affordable for consumers to get many of the aforementioned conveniences. For example, many traditional sedans may include a vehicle key fob that is recognized by the vehicle from a distance to open the doors of the vehicle. Additionally, the vehicle may often include a capacitive touch sensor located along one or more handles of the vehicle to allow for keyless entry by detecting the key fob on the vehicle user.

However, the conventional conveniences being advanced in the market of traditional sedans have unfortunately not extended beyond the traditional locking and unlocking of vehicle doors. Additionally, due to the design of the SUV's and trucks, many additional accessories may be present that have not been designed for ease of use. For example, a truck may include a tailgate and/or tonneau cover disposed over a cargo box of the vehicle that both require manual operation to open and close. While attempts have been made to improve operability of secondary accessories such as a tonneau cover by wiring a button directly to the accessories, there is still significant room for improvement. Wring such buttons may require further running of wires throughout the vehicle, making for complex vehicle designs, additional costs in manufacturing, increased labor and materials, or a combination. Additionally, hard wiring such buttons still requires a significant amount of user interaction and may have very little ability for different configurations for operation.

Thus, there remains a need for a vehicle system having additional functionality to operate accessories of the vehicle. What is needed is one or more sensors that wirelessly connect to the accessories. There remains a need for a vehicle system that decreases physical user interaction to operate one or more accessories. What is needed is a vehicle system having wireless sensing of a user within a defined proximity to automatically operate one or more accessories. Additionally, there remains a need for a vehicle system allowing for diverse configuration and operation of one or more accessories of the vehicle. What is needed is a vehicle system that connects to the accessories free of wiring between the system and the accessories to allow for a variety of configurations and functions.

SUMMARY

The present teachings meet one or more of the present needs by providing a system for a vehicle comprising: an accessory positioned along the vehicle; and a sensor located along the vehicle in wireless communication with the accessory, wherein the sensor triggers activation of the accessory based on input from an external source.

The system herein may include a sensor positioned along a top edge of the cargo box. The sensor may be integrated into a bed cap of the cargo box. The sensor may be a capacitive touch sensor that receives a signal based on a user contacting the sensor, and the sensor sends a wireless signal to the accessory to activate the accessory. The accessory may be a tonneau cover disposed over a top edge of the cargo box, and the sensor wirelessly sends a signal to an actuator of the tonneau cover to move the tonneau cover between an open position and a closed position, or vice versa. The accessory may be a tailgate at least partially enclosing the cargo box, and the sensor wirelessly sends a signal to an actuator of the tailgate to move the tailgate between an open position and a closed position, or vice versa.

Additionally, the sensor may receive a contactless input from an external source when the external source is within a defined proximity to the sensor. Upon receiving the contactless input, the sensor may activate the accessory. The external source may be a fob that sends a signal to the sensor when entering the defined proximity, thereby triggering the sensor to activate a light of the vehicle. The accessory may be a tailgate at least partially enclosing the cargo box, a tonneau cover disposed over at least a portion of the cargo box, or both. The sensor may be located on a tailgate of the vehicle.

Furthermore, the accessory may be a light located within an inner area of the cargo box, and the sensor activates the light to illuminate the inner area of the cargo box. The accessory may include a receiver that receives a signal from the sensor based on the input from the external source. The external source may be a vehicle key fob, cellular device, radio frequency identification (RFID) tag, or a combination thereof. The sensor may be a capacitive touch sensor that wirelessly controls movement of the tonneau cover between the open position and the closed position based upon a user contacting the sensor. The sensor may be a capacitive touch sensor that wirelessly controls movement of the tailgate between the open position and the closed position based upon a user contacting the sensor. Additionally, the system may be free of any wiring running between the sensor and the accessory; the accessory may be a tonneau cover disposed over a top edge of the cargo box, and the sensor is integrated directly into the tonneau cover to wirelessly activate movement of the tonneau cover; or both.

Moreover, the present teachings meet one or more of the present needs by providing a system for a vehicle having a cargo box at least partially enclosed by a tailgate, the system comprising: (a) a tonneau cover disposed over a top edge of the cargo box, the tailgate, or both; (b) lights located along an exterior of the cargo box, an interior of the cargo box, or both; (c) a first sensor located on the cargo box or the tonneau cover in wireless communication with the tonneau cover to actuate the tonneau cover between an open position and a closed position, or vice versa; (d) a second sensor located on the cargo box or the tailgate in wireless communication with the tailgate to actuate the tailgate between an open position and a closed position, or vice versa; and (e) a third sensor located on the cargo box, the tailgate, or the tonneau cover in wireless communication with a light of the vehicle; wherein the first sensor and the second sensor are capacitive touch sensors that actuate the tonneau cover and the tailgate, respectively, based upon a user contacting the touch sensor; and wherein the third sensor is a proximity sensor that receives a wireless signal from a fob when the fob enters a defined proximity circle around the vehicle. The first sensor and the second sensor may actuate both the tonneau cover and the tailgate.

Additionally, the present teachings meet one or more of the present needs by providing: a vehicle system having additional functionality to operate accessories of the vehicle; one or more sensors that wirelessly connect to the accessories; a vehicle system that decreases physical user interaction to operate one or more accessories; a vehicle system having wireless sensing of a user within a defined proximity to automatically operate one or more accessories; a vehicle system allowing for diverse configuration and operation of one or more accessories of the vehicle; a vehicle system that connects to the accessories free of wiring between the system and the accessories to allow for a variety of configurations and functions; or a combination thereof.

DETAILED DESCRIPTION

Figure 1:
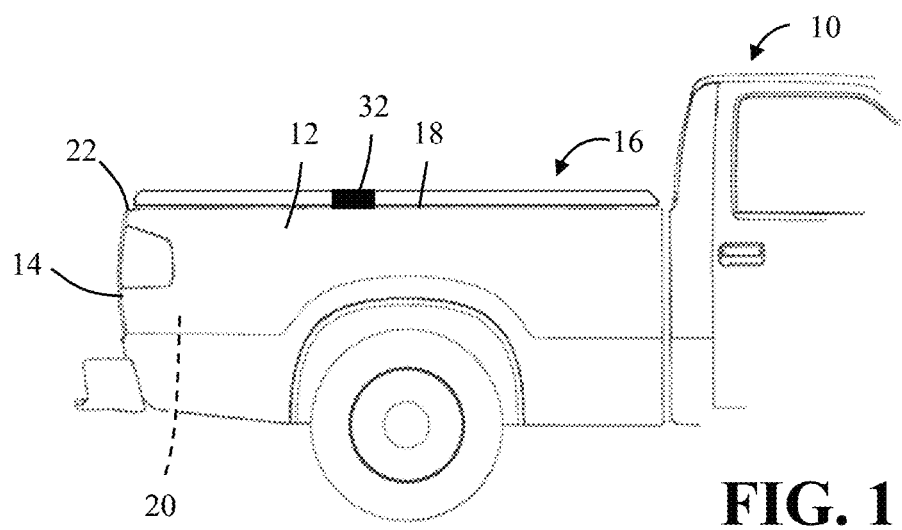
FIG. 1 is a side view of a vehicle having a sensor.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings generally relate to a vehicle and a system for a vehicle. The vehicle may be any type of automobile, such as a car, truck, SUV, commercial vehicle, or a combination thereof. The vehicle may include a system integrating one or more accessories into the vehicle. The accessories may be assembly as part of the vehicle by the Original Equipment Manufacturer (OEM), may be provided as a secondary aftermarket accessory, or a combination thereof. The accessories may include one or more lights, one or more latches, one or more actuators, one or more mirrors, one or more doors, one or more interior accessories, one or more exterior accessories, or a combination thereof.

The accessories may be located near or along a cargo box of the vehicle. The cargo box may be defined as a storage portion of the vehicle adjacent to a cabin of the vehicle. The cargo box may be partially enclosed, fully enclosed, or both. The cargo box may include one or more openings, one or more doors, or a combination thereof.

The cargo box may include a tailgate. The tailgate may function to at least partially enclose the cargo box. The tailgate may function as an access point into the cargo box. The tailgate may be considered an accessory of the cargo box. The tailgate may be moveable between an open position and a closed position. The open position may be when the tailgate is substantially parallel to the ground and provides an open access point into the cargo box. The closed position may be when the tailgate is substantially perpendicular to the ground and substantially encloses at least a portion of the cargo box. The tailgate may also move and/or be secured in one or more positioned between the open position and the closed position. The tailgate may be manually operated by a user or may be actuated by one or more powered actuators. The tailgate may operate with physical user interaction or may be actuated remotely.

The tailgate may be used in conjunction with a tonneau cover. The tonneau cover may function to protect against dirt, debris, water, other contaminants, or a combination thereof from entering an inside of a cargo box. The tonneau cover may be a cover that functions to conceal the inside of the cargo box and/or any contents inside the cargo box. The tonneau cover may be placed over the cargo bed of a vehicle, such as a pickup truck. As such, the tonneau cover may also be considered an accessory of the vehicle.

The tonneau cover may comprise multiple enclosure panels or a single panel. One or more of the panels may be moved or repositioned relative to one another to move the tonneau cover between an open position and a closed position. One or more of the panels may be substantially rigid. One or more of the panels may be substantially flexible but may be stabilized with a rigid frame. Alternatively, the tonneau cover may be a single panel cover. The single panel cover may be raised or pivoted relative to the walls or top edges of the cargo box and/or tailgate to reposition the tonneau cover between an open position and a closed position.

The open or raised position of the tonneau cover may be when the tonneau cover, or at least one enclosure panel of the tonneau cover, is free from contacting, engaging, or is spaced apart from: the tailgate, a top edge of the tailgate, the walls of the cargo bed, a top edge or top surface of the one or more walls of the cargo bed, or a combination thereof. The closed or lowered position of the tonneau cover may be when the tonneau cover, or at least one enclosure panel of the tonneau cover, is in contact with, engages, or rests on the tailgate, a top edge or top surface of the tailgate, a top edge or top surface of the one or more walls of the cargo box, or a combination thereof, but applies less force or pressure thereon compared to when the tonneau cover is in the closed or lowered position. Therefore, the tonneau cover may also provide one or more positions where the tonneau cover may be partially open or raised partially closed or lowered, or a combination thereof.

The tonneau cover may be operated manually by a user. The tonneau cover may be actuated by one or more electronic actuators. For example, the tonneau cover may include a an actuator such as a striker assembly that articulates one or more panels of the tonneau cover to allow for the tailgate to move between an open and closed position, or vice versa, without encumbrance or interference by the tonneau cover.

The one or more striker assemblies may function to at least partially move, displace, open, raise, pop-open, separate, or a combination thereof the tonneau cover away from a top edge or surface of the tailgate, a top edge or surface of the cargo box, or both. For example, as the tailgate begins to be lowered or drawn down into an open position, the one or more striker assemblies may simultaneously or contemporaneously at least partially move, displace, open, raise, pop-open, separate, or a combination thereof at least a portion of the tonneau cover away from the top edge of the tailgate, the top edge of the cargo box, or both. Doing so may advantageously reduce or eliminate friction, contact, drag, sticking, or a combination thereof between the tonneau cover and the tailgate while the tailgate is being opened or lowered. For example, the one or more striker assemblies may provide for opening or lowering the tailgate with lower a force, prevent scratching or other damage to either or both of the inside surface of the tonneau cover and the tailgate, or both.

The one or more striker assemblies may be adapted to at least partially move, displace, open, raise, pop-open, separate, or a combination thereof at least a portion of the tonneau cover away from the top edge of the tailgate, the top edge of the cargo box, or both immediately before the tailgate begins to be lowered or drawn down into the open position. For example, the one or more striker assemblies may move the tonneau cover when the tailgate latch or handle is manipulated, but before the tailgate is actually moved. Alternatively, the one or more striker assemblies may be adapted to at least partially move, displace, open, raise, pop-open, or separate at least a portion of the tonneau cover away from the top edge of the tailgate, the top edge of the cargo box, or both immediately after the tailgate begins to be lowered or drawn down into the open position.

The one or more striker assemblies may be adapted to at least partially move, close, lower, pull-down, draw, or a combination thereof the tonneau cover towards the top edge of the tailgate, the top edge of the cargo box, or both after the tailgate is moved into the closed or raised position. Alternatively, as the tailgate begins to be raised or pushed up into the closed position, the striker assembly may at least partially move, close, lower, pull-down, draw, or a combination thereof at least a portion of the tonneau cover towards the top edge of the tailgate, the top edge of the cargo box, or both. The one or more striker assemblies may at least partially move, close lower, pull-down, draw, or a combination thereof at least a portion of the tonneau cover towards the top edge of the tailgate, the top edge of the cargo box, or both immediately before the tailgate is moved into the final raised or closed position. The one or more striker assemblies may move the tonneau cover into the closed position at substantially the same time that the tailgate is moved into the raised or closed position. Moving the tailgate into the closed position according to any one of the aforementioned sequences may advantageously reduce or eliminate friction, contact, drag, sticking, or a combination thereof between the tonneau cover and the tailgate while the tailgate is being closed or raised. For example, the striker assembly may provide for closing or raising the tailgate with lower a force, prevent scratching or other damage to either or both of the inside surface of the tonneau cover and tailgate, or both.

It is envisioned that a system may be integrated into the vehicle to operate the tailgate, the tonneau cover, additional accessories, or a combination thereof. The system may include one or more sensors connected to the accessories. The sensors may be wired directly to the accessories to send an electric signal from the sensors to the accessories, or vice versa. However, it is envisioned that the sensors may be wirelessly connected to the accessories. Advantageously, wireless connection may allow for the sensors to be positioned anywhere along the vehicle without requiring an access path for wires between the sensors and the accessories.

As stated above, the sensors may be located anywhere along the vehicle. The sensors may be positioned along or within a cabin of the vehicle. The sensors may be located on an exterior of the cargo box or the vehicle. The sensors may be positioned within an inside of the cargo box along an inner fender, an inside panel, a base floor of the cargo box, or a combination thereof. Additionally, the sensors may be located directly on one or more accessories of the vehicle. For example, the sensors may be located directly on the tailgate, the tonneau cover, or both of the vehicle. The sensors located directly on the accessories may still provide a wireless connection to a portion of the accessory operating the accessory. An example may include placing a sensor on the tailgate and/or tonneau cover of the vehicle that is wirelessly connected to an actuator of the tailgate and/or tonneau cover to articulate the tailgate and/or tonneau cover between an open position and a closed position, or vice versa.

By locating one or more sensors directly on the accessories, a wireless system for an accessory may be beneficially provided as a complete aftermarket kit. The accessory may be purchased by a consumer and installed on the vehicle without requiring any retrofitting of the vehicle to operate the wireless connection. Similarly, if the accessory is installed on the vehicle by an OEM, the sensor may be completely integrated within the accessory to decrease components and provide a easier mode of assembly.

Due to the wireless connection, the sensors may accommodate a variety of vehicle configurations. The sensors may be located anywhere along the accessories or the vehicle based upon any packaging constraints without requiring redesign of wiring schematics, vehicle architecture, component designs, or a combination thereof. Similarly, the sensors may be retrofit into an existing vehicle structure that may not have been initially designed for the sensors.

The vehicle may include a single sensor or may include a plurality of sensors. A single sensor may operate a plurality of accessories or a single accessory. Similarly, a plurality of sensors may operate the same accessories or different accessories. Thus, it may be gleaned that the sensors provide a high degree of configuration and tunability.

The sensors may trigger an operation of the accessories. The sensors may send a signal to the accessories based upon a user input, external signal or both. For example, the sensors may send a signal to the accessories based upon physical interaction by the user, wireless interaction by the user (i.e., the user sends a signal to the sensor, thereby triggering the sensor to send a signal to the accessory), or both.

The sensors may be any type of sensor that facilitates operation of a desired accessory. The sensors may be a touch switch, pressure sensor, accelerometer, photodetector, inclinometer, level sensor, infrared (IR) sensor, Hall effect sensor, gyroscope, flex sensor, position sensor, photodiode, thermistor, temperature sensor, light sensor, ultrasonic sensor, acoustic sensor, or any combination thereof. Thus, a vehicle or vehicle system may include a variety of different sensor types based upon the accessories of the vehicle.

The sensors may be battery powered. The sensors may each include a dedicated battery (or battery bank) that powers each sensor. Conversely, the sensors may be powered by a battery of the vehicle. As such, the sensors may be connected to a vehicle battery via one or more wire harnesses. However, the sensors may also be independently powered via an external source. For example, the sensors may be solar-operated and/or may be charged via solar-operation. As such, the sensors may include one or more photovoltaic devices.

The sensor may be a capacitive touch sensor. As such, the sensor may receive a physical input from a user to trigger the sensor to send a signal to one or more accessories. The sensor may include a touch pad or touch surface to facilitate user interaction. The touch surface or touch pad may allow a user to operate one or more accessories in a variety of ways. For example, one or more capacitive touch sensors may be wireless connected to the tailgate, the tonneau cover, or both to articulate the tailgate, the tonneau cover, or both between an open and closed position, or vice versa. The capacitive touch sensor may allow for incremental operation of the tonneau cover, the tailgate, or both so that a user may move the tonneau cover, the tailgate, or both to a number of positioned between fully open and fully closed. Additionally, different inputs by the user (e.g., different contact motions) may trigger different actions of the accessory. For example, initial contact by a user on the capacitive touch sensor may trigger a single panel of the tonneau cover to move away from a top edge of the tailgate. However, a user then dragging their finger or touching a specified location on the sensor for a longer duration or time may then actuate the tailgate from a closed position to an open position, or vice versa. Therefore, the sensors may beneficially integrate an entire system of accessories so that interaction with a single sensor may trigger desired actions of a plurality of accessories.

It is envisioned that the capacitive touch sensors may be located adjacent to, or directly on, the accessories being activated. For example, a capacitive touch sensor operating the tailgate may be located directly on the tailgate or next to the tailgate along a surface of the cargo box. Similarly, a capacitive touch sensor operating the tonneau cover may be located directly on the tonneau cover or near the tonneau cover, such as along a top edge of the cargo box or integrated into a bed cap of the cargo box. While proximity between the sensors and the accessories being controlled may be desired, it should be noted that the sensors may be located anywhere relative to the accessories.

The sensor may be a proximity sensor. The proximity sensor may send a signal to one or more accessories based upon an external fob being a defined distance away from the sensor. Upon the fob reaching the desired distance away from the vehicle, the sensor may receive a signal, thereby triggering the sensor to send the signal to the one or more accessories.

The defined distance away from the vehicle may be established based on a proximity circle. The proximity circle may function to define a desired area in which a fob or external input may trigger the sensor to send a signal. When the fob or external input is located within the confines of the proximity circle, the sensor may then send a signal to one or more accessories. When the fob or external input is located outside of the proximity circle, the sensor may remain deactivated.

When the fob or external input enters the proximity circle, the sensor may automatically send a signal to one or more accessories. For example, when the fob or external input initially enters the proximity circle, the sensor may send a signal to one or more puddle lights to turn on and illuminate at least a portion of the vehicle's perimeter. When the fob or external input leaves the proximity circle, the lights turn off and remain off until the fob or external input reaches the proximity circle again. Additionally, the lights may remain on indefinitely when the fob or external input is within the proximity circle or may diminish after a defined duration of time regardless of whether the fob or external input is still within the proximity circle.

Similarly, a user may be required to physically send a wireless signal to the proximity sensor to trigger activation of one or more accessories. For example, the user may communicate with the sensor via a key fob to turn on the one or more lights of the vehicle. If the user tries to send a command via the key fob (e.g., push a button on the key fob) when outside of the proximity circle, the sensor will not receive the command and/or reject the command due to the distance between the key fob and the sensor being too far. However, when the user enters the proximity circle, the key fob may then be used to send the command to the sensor, thereby triggering the one or more lights of the vehicle to turn on.

The proximity circle may partially or fully encapsulate the vehicle. The proximity circle may extend completely around the vehicle. The vehicle may include a single proximity circle or a plurality of proximity circles for a plurality of sensors. The proximity circle may be any desired area around the vehicle. The proximity circle may customizable based upon an application or may be customized by a user of the vehicle.

While a fob has been described herein to communicate with a proximity sensor, the fob may communicate with any sensor on the vehicle. Additionally, the fob, sensors, and accessories may use any desired type of wireless communication. The wireless communication may utilize radio frequency identification (RFID), Bluetooth, near-field communication (NFC), or a combination thereof. As such, the fob may be an RFID tag, cellular device, other device having Bluetooth of Wi-Fi connection, or a combination thereof. Therefore, the present teachings advantageously provide a vehicle system that may be customized using a variety of wireless communication protocols to meet current consumer demands.

To facilitate communication between the fob and the sensors, the sensors and the accessories, or both, one or more receivers may be located in the sensors, the accessories, or both. The receivers may be connected to the sensors, the accessories, or both, or the receivers may be integrally formed with the sensors, the accessories, or both. The receivers may receive a signal that triggers the sensors to send a signal or the accessories to complete a desired action.

Similarly, the fob, the sensors, the accessories, or a combination thereof may include one or more transmitters to transmit a signal to the fob, the sensors, the accessories, or a combination thereof. The transmitters may be connected to the fob, the sensors, the accessories, or a combination thereof. The transmitters may be integrally formed with the fob, the sensors, the accessories, or a combination thereof.

Turning now to the figures, FIG. 1 illustrates a side view of a vehicle 10. The vehicle 10 includes a cargo box 12 and a tailgate 14. As shown, the tailgate 14 is in a closed position, where the tailgate 14 is at or near a vertical, upright position relative to the ground.

A tonneau cover 16 is placed onto a top edge 18 of the cargo box 12. The tonneau cover 16 may protect against dirt, debris, water, other contaminants, or a combination thereof from entering an inside 20 of the cargo box 12. The tonneau cover 16 is illustrated in the closed position. As shown, when the tonneau cover 16 is in in the closed, the tonneau cover 16 may be in contact with, or at least partially cover, a top edge 18 of the cargo box 12. Additionally, the tonneau cover 16 in the closed position may contact or at least partially cover a top edge 22 of the tailgate 14 when the tailgate 14 is also in the closed position.

The vehicle 10 may also include one or more sensors 32 along the top edge 18 of the cargo box 12. The sensors 32 may be in communication with one or more accessories on the vehicle 10 via a wired connection, a wireless connection, or both. The sensors 32 may receive a contact and/or contactless input from a vehicle operator to activate the one or more accessories associated with the vehicle 10.

Figure 2:
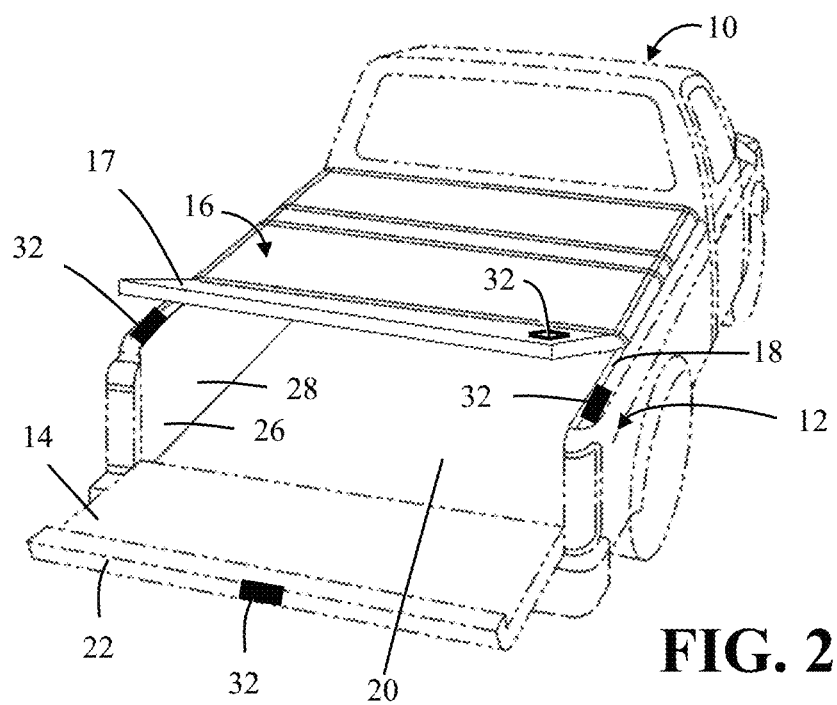
FIG. 2 is a perspective view of a vehicle having a plurality of sensors.

FIG. 2 illustrates a rear perspective view of a vehicle 10. The vehicle includes an interior cabin connected to a cargo box 12 of the vehicle. The cargo box 12 includes opposing inside fenders 26 and/or panels 28 that at least partially form an inside area 20 of the cargo box 12. The cargo box 12 may be accessed via a tailgate 14 configured to open and close relative to the cargo box 12. Additionally, the inside area 20 of the cargo box 12 may be at least partially protected by a movable tonneau cover 16 having a plurality of adjustable panels 17 secured along top edge 18 of the cargo box 12. Accordingly, the tonneau cover 16 may be at least partially opened, fully opened, at least partially closed, fully closed, or a combination thereof to protect the inside area 20 of the cargo box 12, to access the inside area 20 of the cargo box 12, or both.

As shown, the vehicle 10 may include a plurality of sensors 32. The sensors 32 may be positioned anywhere along the vehicle 10 based on a desired application. However, it is envisioned that the sensors 32 may be located along the top edge 18 of the cargo box 12 (e.g., integrated into bed caps of the cargo box 12) and/or along a top edge 22 of the tailgate 14. It should be noted that the positions shown in FIG. 2 are merely exemplary locations of the sensors 32 and are no was intended to be limiting to the teachings herein. Additionally, one or more of the sensors 32 may be integrated directly into one or more of the panels 17 of the tonneau cover 16. As such, it is envisioned that the sensor 32 may beneficially be integrated into the tonneau cover 16 as an aftermarket accessory. The sensor 32 on the tonneau cover 16 may then wirelessly communicate with the vehicle 10, thereby eliminating any additional wiring or configuration. For example, the sensor 32 on the tonneau cover 16 may be in communication with an actuator located along the cargo box 12. The sensor 32 may be activated based on user input so that the actuator may actuate the tonneau cover 16 and move the tonneau cover 16 between an open position and a closed position (see, e.g., FIG. 3).

Figure 3:
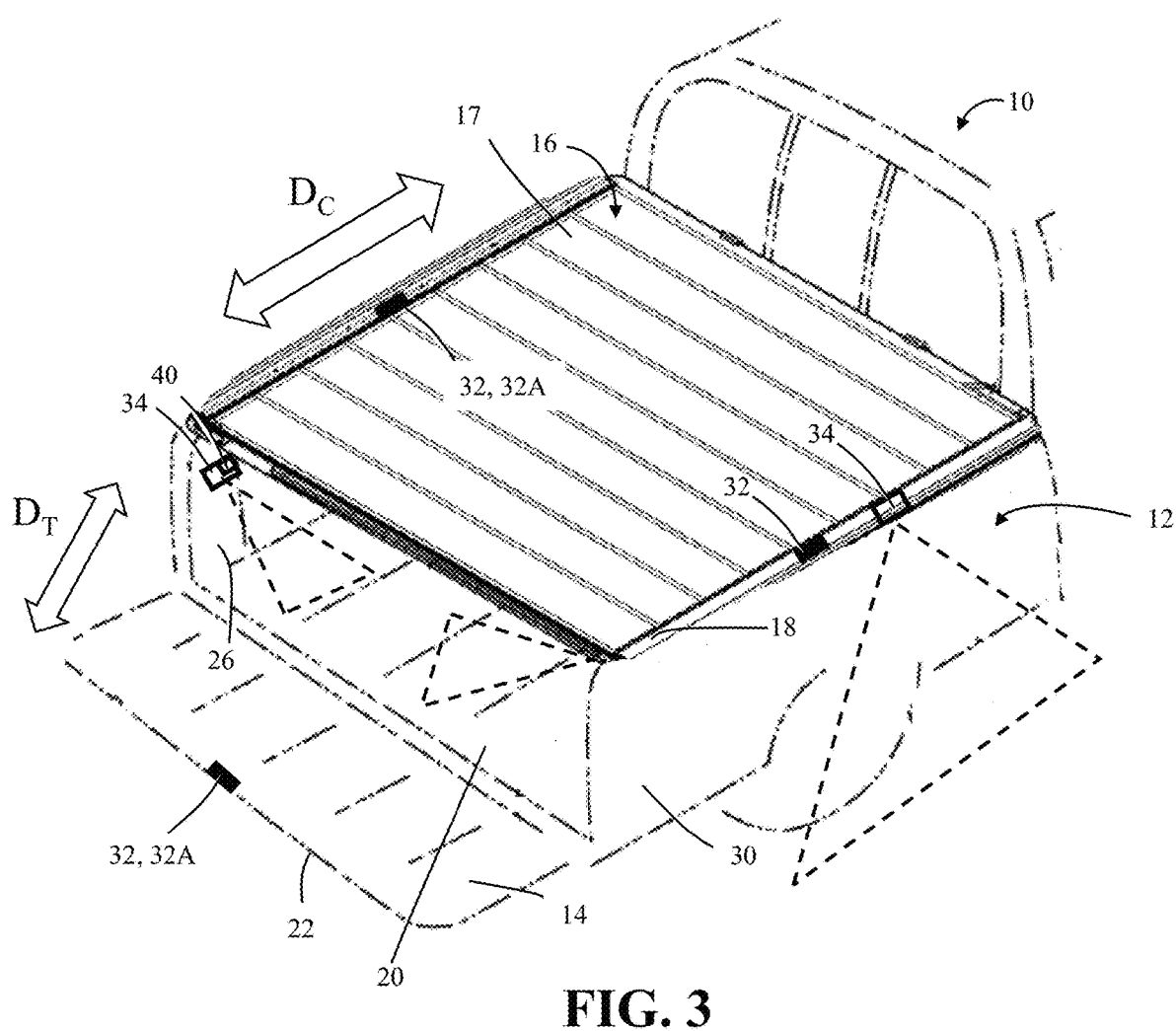
FIG. 3 is a perspective view of a vehicle having a plurality of sensors.

FIG. 3 illustrates a perspective view of a vehicle 10 having a plurality of sensor 32 in communication with accessories of the vehicle 10. The vehicle 10 includes a cargo box 12 having an inside area 20 at least partially formed by opposing inner fenders 26 and a movable tailgate 14. The inside area 20 of the cargo box 12 may be at least partially covered by a tonneau cover 14 disposed along a top edge 18 of the cargo box 12.

The vehicle 10 may include one or more sensors 32 located along the top edge 18 of the cargo box 12. The sensors 32 may be positioned on a bed cap of the cargo box 12, along the tonneau cover 16, another area of the cargo box 12, or a combination thereof. For example, the sensors 32 may also be located along an outer fender 30 near or proximate to the top edge 18 of the cargo box. The sensors 32 may be configured to receive an input from a vehicle operator based on physical contact, contactless input, or both. The sensors 32 may be in communication with one or more accessories of the vehicle 10, such as the tonneau cover 16, one or more lights 34, or both. For example, the sensors 32 may receive an input from a user to turn on a light 34 positioned along an outer perimeter of the vehicle 10 to provide puddle lights around the vehicle 10 or otherwise illuminate an outer portion of the vehicle 10.

The sensors 32 may also communicate with the tonneau cover 16 based on user input. It is envisioned that the sensors 32 may include capacitive touch sensing to allow for manual input from the user. A capacitive touch sensor 32A may include a contact surface so that a user may operate the tonneau cover 16. The input from the user on the capacitive touch sensor 32A may trigger actuation or an actuator or other device that moves the tonneau cover between an open and a closed position in a desired direction $D_C$, thereby moving one or more panels 17 of the tonneau cover 16. Beneficially, the capacitive touch sensor 32A may be wirelessly connected to the tonneau cover 16 and/or actuator moving the tonneau cover 16. As such, the capacitive touch sensor 32A may not require any wiring run through the vehicle 10, thereby decreasing cost from materials and labor.

The vehicle 10 may also include an additional sensor 32 on the tailgate 14. The sensor 32 may be positioned along a top edge 22 of the tailgate 14. However, the sensor 32 may be located anywhere along the tailgate 14. The sensor 32 may also be a capacitive touch sensor 32A that is configured to receive user input along a contact surface. The user may thus be able to move the tailgate 14 between an open position and a closed position in a desired direction $D_T$. The user input may not only move the tailgate 14, but also move all or a portion of the tonneau cover 16. For example, when the tailgate 14 is move to a closed position, the tonneau cover 16 may be at least partially raised to allow for the tailgate 14 to fully close before the tonneau cover 16 is lowered back onto the top edge 22 of the tailgate 14. Similarly, contact of the capacitive touch sensor 32A located on the tailgate 14 may trigger the tonneau cover 16 to at least partially raise, thereby allowing the tailgate to open without obstruction from the tonneau cover 16.

Advantageously, the sensors 32 may be in communication with more than one accessory (e.g., the tonneau cover 16, the tailgate 14, the lights 34, or a combination thereof) based upon a wireless connection. For example, the capacitive touch sensors 32A located on the top edge 22 of the tailgate 14 may communicate not only open and/or close the tailgate, but also partially move the tonneau cover 16, illuminate lights 34 located inside 20 the cargo box 12, or both. The wireless connection with the sensors 32 may be facilitated by one or more of the accessories including a receiver 40 that may receive a signal from the sensors 32. The receiver 40 may be integrated directly into the accessories (e.g., a receiver 40 may be located directly within the lights 34 or any other accessory) or may be positioned adjacent to the accessory. Additionally, where movement of the tonneau cover 16 and/or the tailgate 14 is triggered by the sensors 32, the actuators may also include a receiver.

Figure 4:
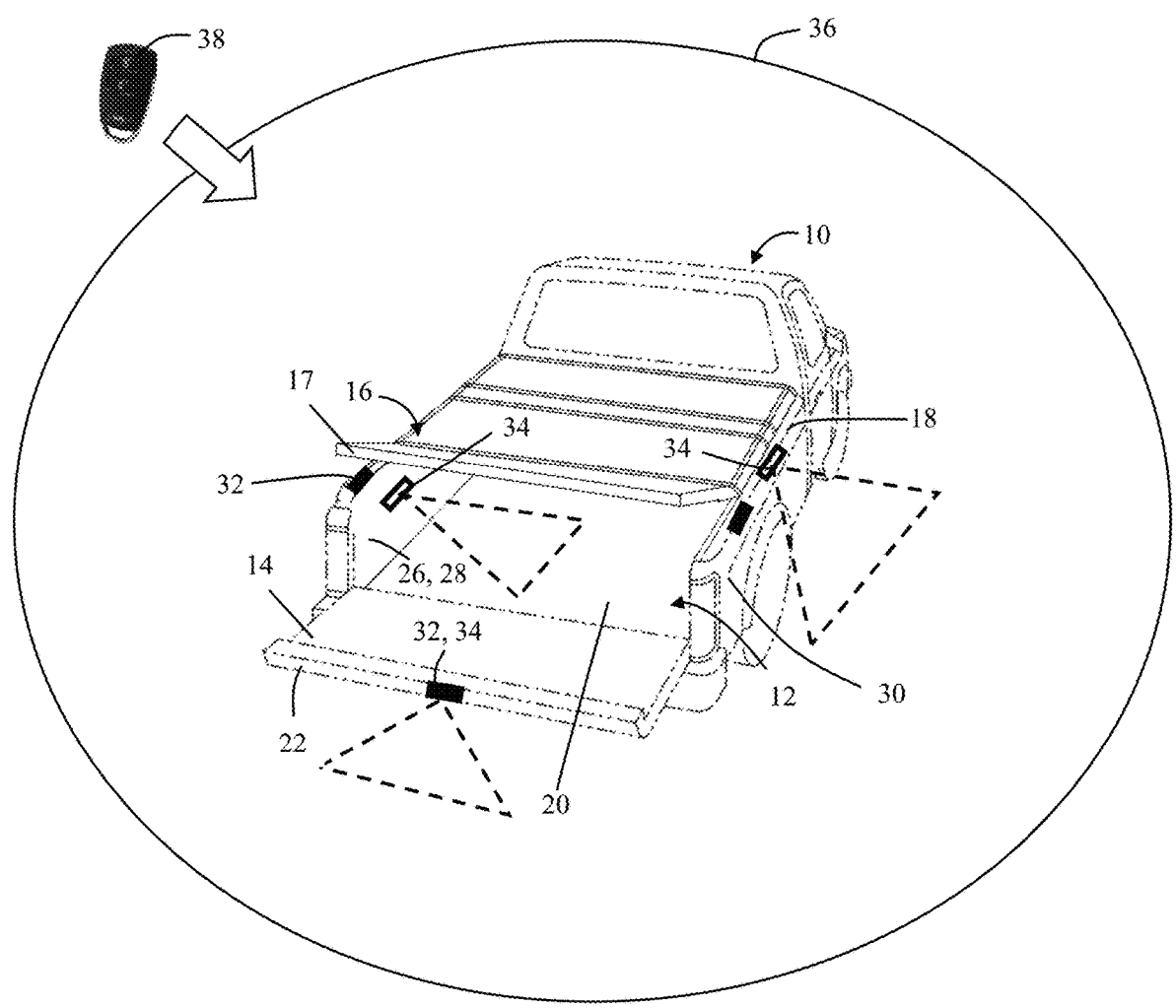
FIG. 4 is a perspective view of a vehicle illustrating a proximity sensor.

FIG. 4 illustrates the vehicle 10 shown in FIG. 2. As discussed above, the vehicle 10 includes a cargo box 12 at least partially enclosed by opposing inside panels 28 or inner fenders 26, a tailgate 14, and a tonneau cover 16 disposed over a top edge 18 of the cargo box 12.

The vehicle 10 also includes a plurality of sensors 32. As discussed regarding FIG. 3 above, the sensors 32 may be capacitive touch sensors, contactless sensors, or both. The sensors 32 may send a signal to one or more accessories, such as a light 34, the tonneau cover 16, the tailgate 14, or a combination thereof to trigger a desired action. The desired action may, for example, be illumination of the lights 34, actuation of an actuator connected to the tonneau cover 16, the tailgate 14, or both, unlocking of vehicle doors, triggering vehicle ignition, or a combination thereof.

One or more of the sensors 32 may also be triggered based upon proximity of a fob 38. The fob 38 may be an item often carried by a vehicle user, such as a vehicle key fob, cellular device, RFID tag, other type of fob, or a combination thereof. When the fob 38 reaches the confines of a proximity circle 36, one or more of the sensors 32 may receive a signal from the fob 38. The signal received by the sensor 32 may then trigger the sensor 32 to send a command to one or more accessories of the vehicle 10. For example, when the fob 38 enters the proximity circle 36, the sensors 32 may send a signal to a receiver (see, e.g., FIG. 3) of the lights 34, thereby illuminating an area around the vehicle 10 (e.g., puddle lights), illuminating an inside area 20 of the cargo box 12, or both.

It may be gleaned from the teachings above that the sensors 32 may include a receiver that receives a signal from the fob 38. The sensors 32 may also include one or more transmitters that sends a signal to one or more of the accessories. Additionally, it is envisioned that one or more of the sensors 32 may be integrated with one or more of the accessories. For example, as shown in FIG. 4, the sensor 32 positioned along a top edge 22 of the tailgate 14 may also include the light for illuminating a portion of the vehicle perimeter. Thus, the sensors 32 may minimize a packaging footprint along the vehicle 10 while also decreasing manufacturing costs.

ELEMENT LIST

10 Vehicle
12 Cargo Box
14 Tailgate
16 Tonneau Cover
17 Tonneau Cover Panel
18 Top Edge of the Cargo Box
20 Inside of the Cargo Box
22 Top Edge of Tailgate
26 Inner Fender
28 Inside Panel
30 Outer Fender
32 Sensor
32A Capacitive Touch Sensor
34 Light
36 Proximity Circle
38 Fob
$D_C$ Direction of Opening/Closing the Tonneau Cover
$D_T$ Direction of Opening/Closing the Tailgate The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100 +/−15.

The disclosures of all articles and references, including patent applications and publications, are incorporated by reference for all purposes. Other combinations are also possible as will be gleaned from the following claims, which are also hereby incorporated by reference into this written description.

What is claimed is:

1. A system for a vehicle comprising:
   (a) an accessory positioned along the vehicle; and
   (b) a capacitive touch sensor integrated into a bed cap located along a top edge of a cargo box of the vehicle, the capacitive touch sensor being in communication with the accessory, wherein the capacitive touch sensor wirelessly triggers activation of the accessory based on a user contacting the capacitive touch sensor.

2. The system of claim 1, wherein the capacitive touch sensor sends a wireless signal to the accessory to activate the accessory.

3. The system of claim 2, wherein the accessory is a tonneau cover disposed over a top edge of the cargo box, and the capacitive touch sensor wirelessly sends a signal to an actuator of the tonneau cover to move the tonneau cover between an open position and a closed position, or vice versa.

4. The system of claim 3, wherein the capacitive touch sensor wirelessly controls movement of the tonneau cover between the open position and the closed position based upon a user physically contacting the capacitive touch sensor.

5. The system of claim 2, wherein the accessory is a tailgate at least partially enclosing the cargo box, and the capacitive touch sensor wirelessly sends a signal to an actuator of the tailgate to move the tailgate between an open position and a closed position, or vice versa.

6. The system of claim 5, wherein the system is free of any wiring running between the capacitive touch sensor and the accessory.

7. The system of claim 1, wherein the system includes a proximity sensor that receives a contactless input from an external source when the external source is within a defined proximity to the capacitive touch sensor.

8. The system of claim 7, wherein upon receiving the contactless input, the proximity sensor activates the accessory.

9. The system of claim 8, wherein the external source is a fob that sends a signal to the proximity sensor when entering the defined proximity, thereby triggering the proximity sensor to activate a light of the vehicle.

10. The system of claim 9, wherein the light is located within an inner area of the cargo box, and the proximity sensor activates the light to illuminate the inner area of the cargo box.

11. The system of claim 8, wherein the external source is a vehicle key fob, cellular device, radio frequency identification (RFID) tag, or a combination thereof.

12. The system of claim 7, wherein the proximity sensor is located on a tailgate of the vehicle.

13. The system of claim 1, wherein the accessory is a tailgate at least partially enclosing the cargo box, a tonneau cover disposed over at least a portion of the cargo box, or both.

14. The system of claim 1, wherein the accessory includes a receiver that receives a signal from the capacitive touch sensor based on the input from the external source.

15. The system of claim 1, wherein the accessory is a tonneau cover disposed over a top edge of the cargo box, and the capacitive touch sensor wirelessly activates movement of the tonneau cover.

16. A system for a vehicle having a cargo box at least partially enclosed by a tailgate, the system comprising:
 (a) a tonneau cover disposed over a top edge of the cargo box, the tailgate, or both;
 (b) lights located along an exterior of the cargo box, an interior of the cargo box, or both;
 (c) a first capacitive touch sensor integrated directly into the tonneau cover in wireless communication with an actuator of the tonneau cover that actuates the tonneau cover between an open position and a closed position, or vice versa based upon a user contacting the first capacitive touch sensor;
 (d) a second capacitive touch sensor located on the cargo box or the tailgate in wireless communication with an actuator of the tailgate to actuate the tailgate between an open position and a closed position, or vice versa based upon a user contacting the second capacitive touch sensor; and
a proximity sensor located on the cargo box, the tailgate, or the tonneau cover in wireless communication with a light of the vehicle to illuminate the light based upon a signal received from a fob when the fob enters a defined proximity circle around the vehicle.

17. The system of claim 16, wherein the first and the second capacitive touch sensors actuate both the tonneau cover and the tailgate.

18. The system of claim 16, wherein the light are located within the interior of the cargo box.

19. The system of claim 17, wherein the second capacitive touch sensor is integrated into a bed cap located along the top edge of the cargo box.

20. The system of claim 3, wherein the capacitive touch sensor facilitates incremental movement of the tonneau cover between the open position and the closed.

* * * * *